June 17, 1952 — G. ALMQUIST — 2,600,827
HAY BALER SLEEVE
Filed Aug. 25, 1947 — 2 SHEETS—SHEET 1

INVENTOR.
Gus Almquist
BY Victor J. Evans & Co.
ATTORNEYS

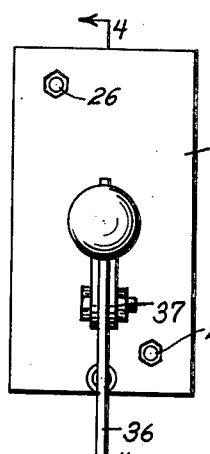
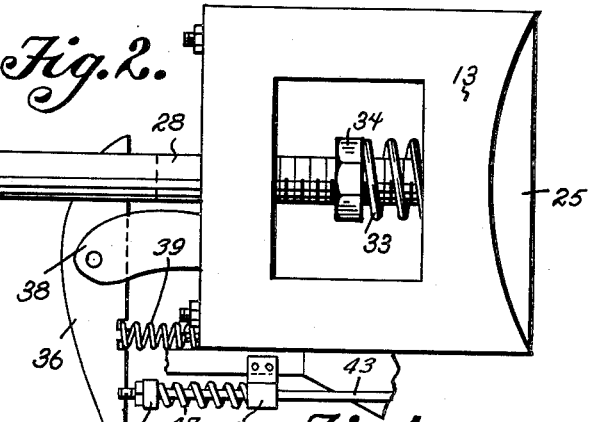
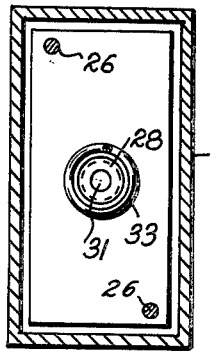
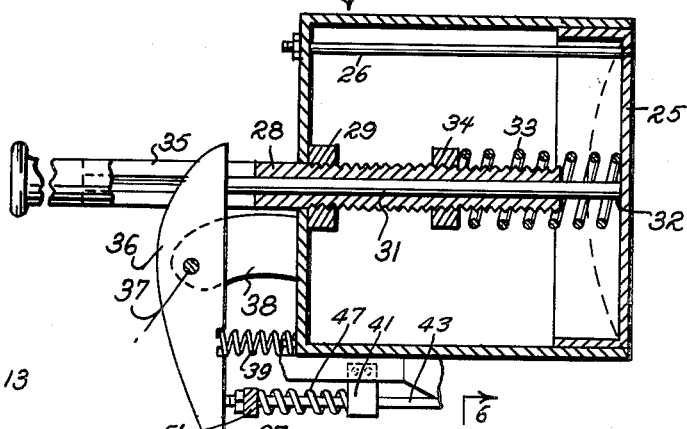
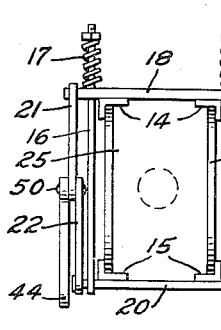

Patented June 17, 1952

2,600,827

UNITED STATES PATENT OFFICE 2,600,827

HAY BALER SLEEVE

Gus Almquist, Riverside, Calif.

Application August 25, 1947, Serial No. 770,463

1 Claim. (Cl. 100—23)

This invention relates to a hay baler sleeve.

It is an object of the present invention to provide a control device for use with hay balers which will automatically control the weight of the hay bale and in which adjusting means is provided that can be set to provide a hay bale of a desired weight.

Other objects of the present invention are to provide a weight control device for hay balers which is of simple construction, easy to assemble and adjust, inexpensive to manufacture and efficient in operation.

For other objects and for a better understanding of the invention, reference may be had to the following detailed description taken in connection with the accompanying drawing, in which Fig. 1 is a side elevational view of a hay baling machine with which the weight control device of the present invention is included.

Fig. 2 is a side elevational view of the control device.

Fig. 3 is an enlarged front elevational view of the control device.

Fig. 4 is a longitudinal cross-sectional view of the control device taken on line 4—4 of Fig. 3, with the plunger thereof extended to its forward position.

Fig. 5 is a longitudinal cross-sectional view similar to Fig. 4 where the plunger has been forced rearwardly to operate the parts for reducing pressure on the bale in the hay baler.

Fig. 6 is a transverse cross-sectional view taken on line 6—6 of Fig. 5.

Fig. 7 is an end elevational view showing the discharge end of the baler with the wheels, hopper, and operating elements of the opposite end omitted.

Figures 1, 1A:
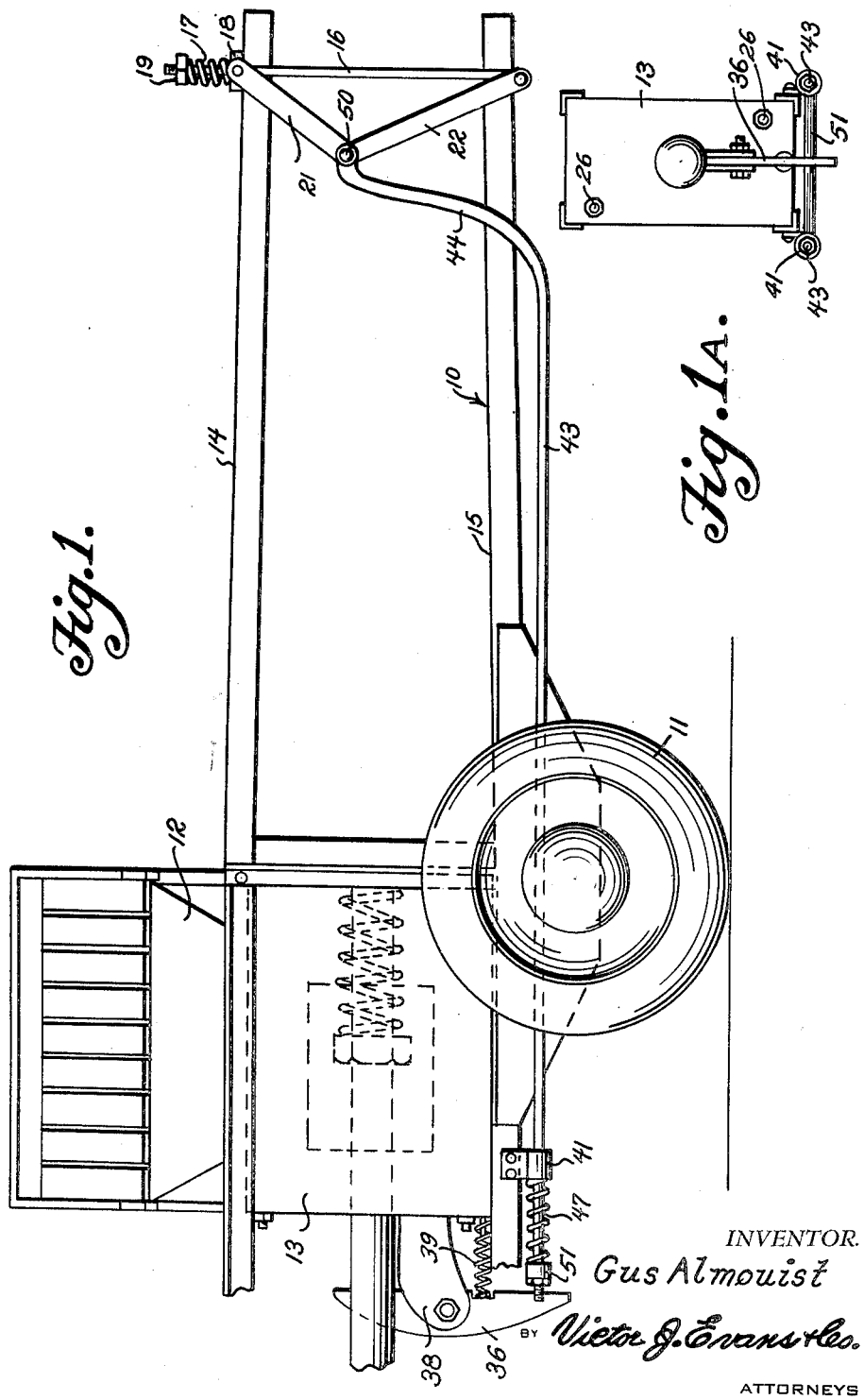
Fig. 1a is an end elevational view of the control device with the hopper, wheels, and toggle elements at the opposite end of the baler omitted, and showing the attachment of the control device to a hay baler.

Referring now to the figures, 10 represents a hay baler having supporting wheels 11 and a hopper 12 by means of which hay is extended into a space to be gathered and compressed by a packing head 13 bearing the control device of the present invention. Extending from the hopper are top and bottom supports 14 and 15 adapted to receive the compressed hay and which are inclined toward one another to provide adequate friction for retaining the portions of the compressed hay as they are formed into a bale. These top and bottom parts are retained together by vertical rods 16. On the upper ends of the rods are springs 17 adapted to bear against a horizontally disposed transverse member 18 and the under surfaces of adjusting nuts 19 on the upper ends of the vertical rods 16. The lower ends of the vertical rods 16 are mounted on the ends of a transverse shaft 20 extended across the end of the baler frame and positioned below the lower support 15. Toggle levers 21 are pivotally mounted on the ends of the transverse member 18 and coacting toggle levers 22 are pivotally mounted on the end of the shaft 20. The toggle levers 21 and 22 on the sides of the baler frame are pivotally connected by pins 50.

The packing head 13 has a plunger 25 therein and the plunger is adapted for slidable movement. The outward movement of the plunger is limited by rods 26 which extend through the closed end of the packing head 13 and are retained against outward displacement by adjusting nuts 27. On the inner face of the wall of the packing head 13 is a threaded shaft 28 which is adjustable therethrough and is retained against outward displacement by a nut 29. This shaft 28 has a hole extending therethrough in which is extended a rod 31 which is secured as by welding to the inner side of plunger 25 as indicated at 32. A spring 33 surrounds the rod 31 and the inner end of the shaft 28 and is retained by an adjustable nut 34 which may be used to regulate the spring tension upon the plunger 25. The shaft 28 has a slot 35 therein into which is extended a lever 36 pivoted at 37 on a bracket 38 on the packing head and normally urged toward the end of the rod 31 by a spring 39 carried on the packing head. As a predetermined pressure is encountered by the plunger 25 as the packing head 13 is brought against the portions of the hay being baled between the parts 14 and 15, the lever 36 will be pivoted rearwardly to assume a position shown in Fig. 5 whereby to compress the spring 39 as the spring 33 on the plunger 25 is compressed thereby drawing the shaft 31 rearwardly. On the sides of the baler are bars 43 which are slidably mounted in brackets 41 and the outer ends are provided with upwardly extended ends 44 that are connected to the toggle levers 21 and 22 by the pins 50. The lower ends of the levers 22 being pivotally mounted on a transversely disposed shaft 20 and the upper ends of the levers 21 being pivotally mounted on the ends of the member 18, the supports or frame sections 14 and 15 will spread as the bars 43 are moved rearwardly and contract as the bars are drawn forwardly. With the forward ends of the rods 43 held forwardly by the springs 47, the toggle levers hold the extended ends of the members 14 and 15 together, and as the rods 43 are forced rearwardly by the lever 36 the ends of the members 14 and 15 are spread compressing the springs 17 so that pressure on bales of hay held therein is reduced.

While various changes may be made in the detail construction, it shall be understood that such changes shall be within the spirit and scope of the present invention as defined by the appended claim.

I claim:

In a hay baler, the combination which comprises an elongated hay baler frame, rectangular shaped in cross section and having upper and lower horizontally disposed sections extending therefrom, a packing head mounted in one end of the frame, a packing plunger slidably mounted in the said packing head and having guide rods extended through the packing head for limiting travel of the plunger in the packing head, a centrally disposed tubular shaft adjustably mounted in the packing head and having a vertically disposed slot therethrough, a control rod extended from the plunger and slidably mounted in the said tubular shaft, said rod positioned with one end extended into the said slot of the tubular shaft, a spring positioned on the tubular shaft for urging the plunger toward material being packed in the frame, a lever pivotally mounted on the end of the packing head and positioned with one end extended into the slot of the tubular shaft to engage the control rod, and with the opposite end extended downwardly from the said packing head, a cross bar suspended from the frame adjacent to the packing head and positioned to be engaged by the lower end of the said lever, horizontally disposed bars connected to the said cross bar and extending on opposite sides of the frame, upper and lower toggle levers pivotally connected to the ends of the bars, a shaft mounted on the extended end of the lower section of the frame, means connecting the lower toggle levers to the ends of the shaft, a transverse member extended across the extended end of the upper section of the frame, means connecting the upper toggle levers to the ends of the said transverse member, vertical rods pivotally connected to and extended from the shaft positioned on the extended end of the lower section of the frame and extended through the said transverse member on the upper section of the frame, adjusting nuts positioned on the upper ends of the vertical rods, and springs positioned between the said transverse member and nuts, said toggle levers providing reduced pressure on a bale of hay positioned between the extended sections of the baler frame when the bars are actuated by the lever on the packing head.

GUS ALMQUIST.

REFERENCES CITED

The following references are of record in the file of this patent:

UNITED STATES PATENTS

| Number | Name | Date |
|---|---|---|
| 1,050,110 | Davis | Jan. 14, 1913 |
| 1,631,881 | Murray | June 7, 1927 |
| 2,396,720 | Nolt | Mar. 19, 1946 |
| 2,411,467 | Russell | Nov. 19, 1946 |
| 2,478,012 | Raney | Aug. 2, 1949 |

FOREIGN PATENTS

| Number | Country | Date |
|---|---|---|
| 138,427 | Germany | Feb. 3, 1903 |